United States Patent [19]

Anderson

[11] 4,331,042
[45] May 25, 1982

[54] SOLAR GENERATOR

[76] Inventor: Jerry L. Anderson, 5900 E. Thomas Rd., Apt. G115, Scottsdale, Ariz. 85251

[21] Appl. No.: 111,931

[22] Filed: Jan. 14, 1980

[51] Int. Cl.³ .............................................. G05G 3/00
[52] U.S. Cl. .................................. 74/572; 60/641.12; 415/199.5
[58] Field of Search ................ 60/641 AG, 650, 682, 60/641 A, 398; 415/199.4, 199.5, 213 C; 74/573 R, 572

[56] References Cited

U.S. PATENT DOCUMENTS

| | | | |
|---|---|---|---|
| 94,901 | 8/1869 | Duclos | 74/572 X |
| 713,158 | 11/1902 | Savage | 415/199.5 X |
| 3,936,652 | 2/1976 | Levine | 60/682 X |
| 4,001,597 | 1/1977 | Graff | 60/398 X |
| 4,118,636 | 10/1978 | Christian | 60/641 AG |

FOREIGN PATENT DOCUMENTS

| | | | |
|---|---|---|---|
| 164912 | 8/1955 | Australia | 60/641 |
| 527585 | 5/1955 | Italy | 415/199.4 |

*Primary Examiner*—Allen M. Ostrager
*Assistant Examiner*—Stephen F. Husar
*Attorney, Agent, or Firm*—Harry M. Weiss

[57] ABSTRACT

A solar generator includes a chamber in the form of a half tee-pee having a chimney-like outlet at an upper end thereof. An air turbine is mounted within the outlet and is coupled to an electric generator. Air inlet tubes are provided at the base of the structure. As air within the chamber is heated by the sun, it rises and passes, at an increased velocity due to the Venturi effect, through the turbine causing the blades thereof to turn.

1 Claim, 6 Drawing Figures

SOLAR GENERATOR

BACKGROUND OF THE INVENTION

1. Field of the Invention

This relates generally to apparatus for generating electricity and, more particularly, to a generator of electricity which utilizes solar heated air to power a turbine which in turn drives an electrical generator.

2. Description of the Prior Art

As a result of the current energy crisis, great emphasis is being placed on alternate sources of energy. Solar energy is one such alternate. For example, solar hot water heaters are becoming more and more popular; however, there is a continuing effort to develop simple and efficient solar powered electrical generators.

One of the problems encountered when attempts are made to convert solar energy directly to electrical energy is that the real-time solar forces developed are generally small; too small to efficiently cause rotation of a flywheel coupled onto the shaft of a standard electrical generator.

SUMMARY OF THE INVENTION

It is an object of the present invention to provide an improved solar powered electrical generator.

It is a further object of the present invention to provide a solar powered electrical generator which utilizes rising warm air to activate a turbine which in turn rotates the central shaft of an electrical generator and a flywheel coupled thereto.

It is a still further object of the invention to provide an improved hot air driven turbine.

Yet another object of the invention is to provide an improved turbine for use in a solar powered electrical generator.

A still further object of the present invention is to provide an improved flywheel for use in a solar powered electrical generator.

Finally, it is an object of the present invention to provide a loadless start flywheel equipped with a pneumatic return.

According to a broad aspect of the invention, there is provided a solar generator comprising a heating chamber having an exterior surface which is solar heated which in turn heats air within said chamber, said chamber having at least one air outlet near an upper end thereof and at least one air inlet located below said at least one outlet, and first means coupled to said at least one outlet and responsive to heated air flowing from said at least one inlet to said at least one outlet for producing electricity.

According to a further aspect of the invention, there is provided a turbine having an inlet and an outlet comprising a cylindrical housing, a shaft mounted for rotation in said housing, and a plurality of alternately positioned major diameter and minor diameter blades fixedly coupled to said shaft and pitched at a predetermined angle so as to cause rotation of said shaft when air passes from said inlet to said outlet.

According to a still further aspect of the invention, there is provided a flywheel comprising a hub having a central aperture therethrough, a plurality of shafts fixedly coupled to said hub and extending radially outward therefrom, pneumatic means coupled to the end of said plurality of shafts, and a plurality of weights each one slidably mounted on one of said plurality of shafts between said hub and said pneumatic means for compressing said pneumatic means as the rotational speed of the flywheel increases.

The above and other objects, features, and advantages of the invention will be better understood from the following detailed description taken in conjunction with the accompanying drawings, in which:

DESCRIPTION OF THE PREFERRED EMBODIMENT

Figure 1:
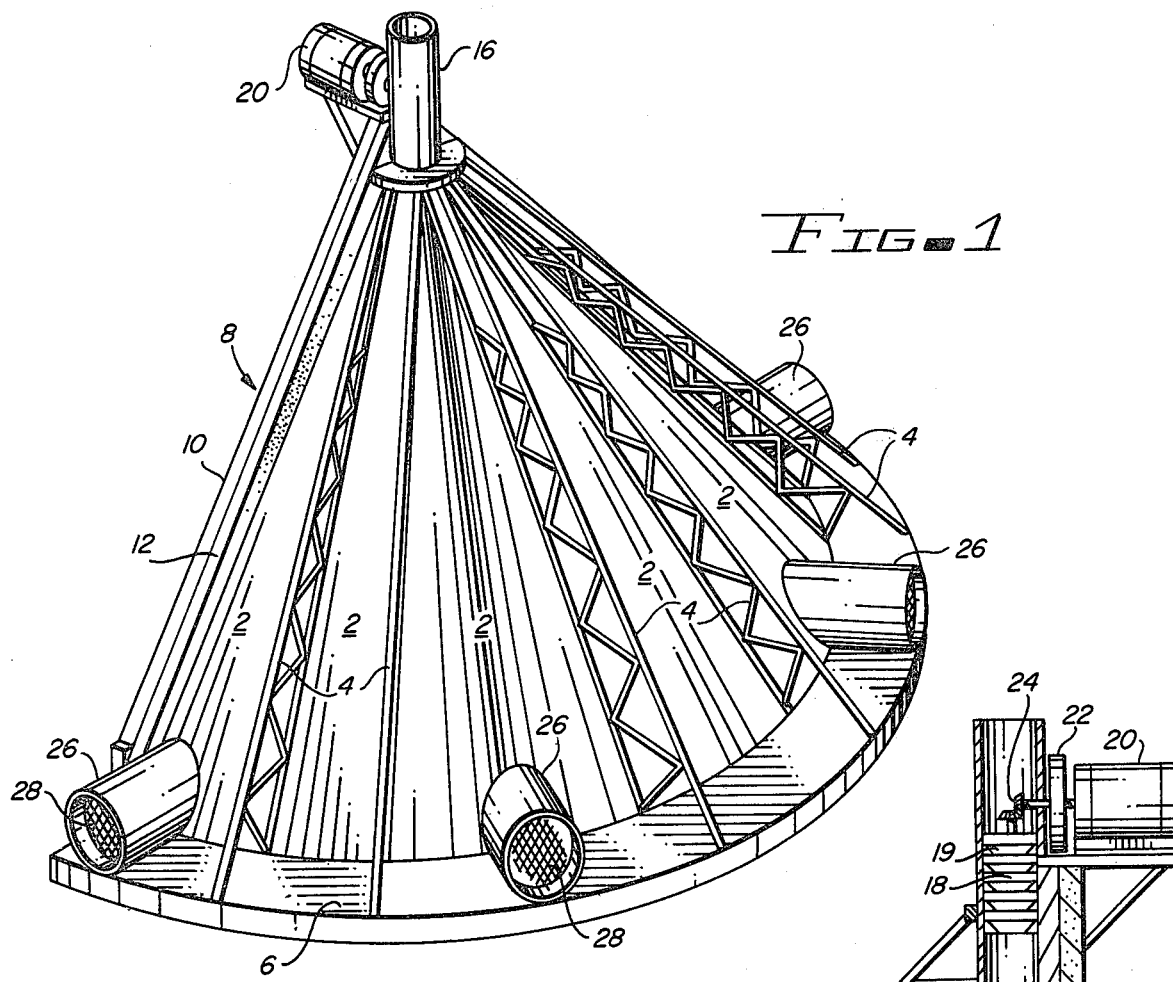
FIG. 1 is a front view of the inventive solar powered electrical generator.
Figure 2:
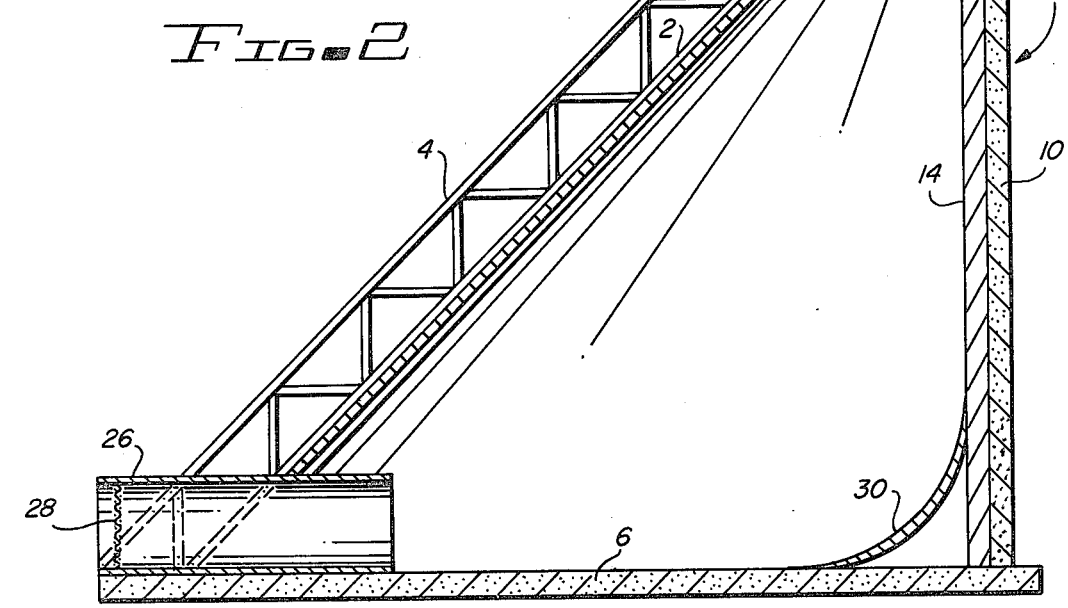
FIG. 2 is a side cross-sectional view of the generator shown in FIG. 1.

Referring to FIGS. 1 and 2 which are front and side cross-sectional views respectively of the inventive solar generator, a plurality of sections of smooth steel sheeting 2 (e.g. 14 gauge) having a layer of black paint thereon are coupled to and between (as by welding) a plurality of open web steel joists 4 so as to form a half tee-pee type chamber mounted on a semicircular slab 6 of concrete (e.g. 12 inches thick) having a radius of, for example, 50 feet.

A masonry support wall 8 (e.g. 60 feet high) supported by pilasters 10 is coupled to slab 6 and forms the rear wall of the structure. The inner surface of wall 8 is provided with a layer of insulation (e.g. foam) 12 which in turn has an inner surface 14 which is highly reflective.

The upper portion of the structure is provided with a chimney-like opening or outlet 16 in which a turbine 18 having a plurality of blades 19 is positioned. An electric generator 20 is mounted near the top of the structure, the central shaft of which is coupled to turbine 18 by means of, for example, a pair of right-angle bevel gears 24. A flywheel 22 is mounted on the central shaft of generator 20.

The bottom of the structure is provided with a plurality of air inlets which may take the form of steel tubes 26 which extend to the interior of the structure. For safety, a mesh screen may be positioned within tubes 26 as is shown at 28. The lower portion of the interior of the structure may also be provided with a deflector 30 which assists in providing a smooth flow of air.

The structure operates as follows. Solar heat is absorbed by steel plates 2 which in turn heat the air within the structure. As the air warms, it rises into chimney 16 where its velocity is substantially increased as a result of the well known Venturi effect. Before passing out of chimney 16, the heated air passes through turbine 18 causing blades 19 to rotate. This rotation is transmitted via bevel gears 24 to flywheel 22 which maintains rotary motion within generator 20 to generate electricity. Heated air which escapes through chimney 16 is replaced by outside air which enters the structure through tubes 26.

Figure 3A:
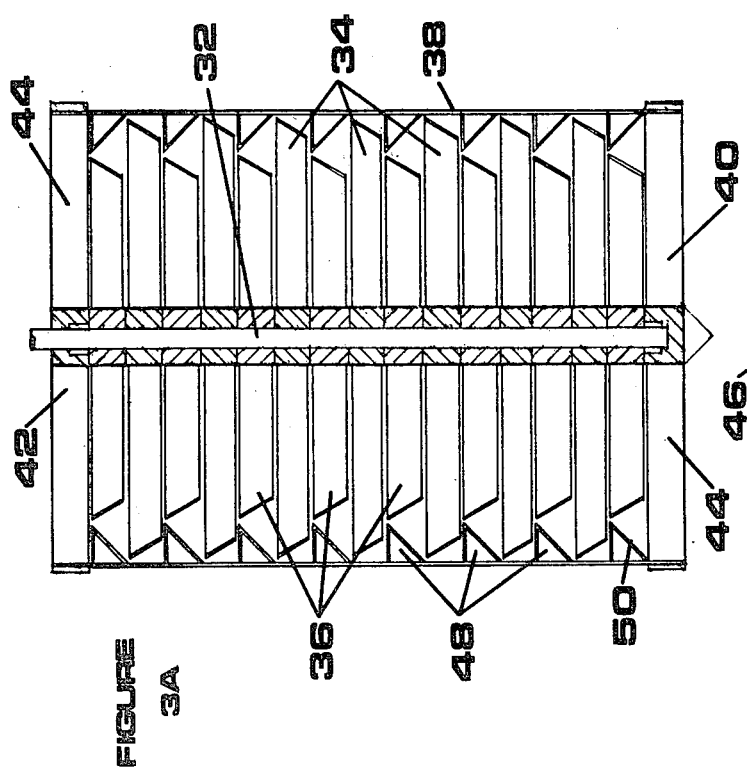
FIGS. 3A and 3B are interior front and top views respectively of the turbine shown in FIG. 1.
Figure 3B:
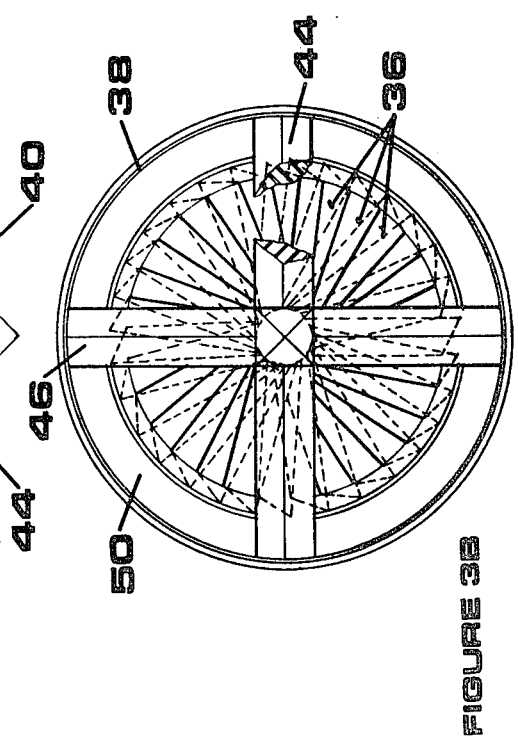

FIGS. 3A and 3B are front and top interior views of a split case turbine suitable for use as the turbine shown in FIG. 1. A central shaft 32 has a plurality of blades mounted thereon. The blades are alternately major diameter blades 34 and minor diameter blades 36. Each of the blades is pitched at, for example, 45° so that air passing through the turbine will cause rotation of the blades and center shaft.

The shaft and blade assembly is mounted in a cylindrical housing 38 having an intake end 40 and an exit end 42. A pair of cross-members 44 and 46 are coupled to each of the intake and exit ends of the housing. These members serve to support the shaft and blade assembly. Also coupled to the interior of housing 38 are a plurality of deflectors such as is shown at 48, each of which extends circumferentially around the interior of housing 38. The deflectors have a right triangular cross-section with the hypotenuse 50 facing the intake end 40 of the turbine. These deflectors have the effect of increasing the velocity of air through the turbine and force air radially inward so as to have a maximum turning effect on the blades and thus shaft 32.

Figure 4A:
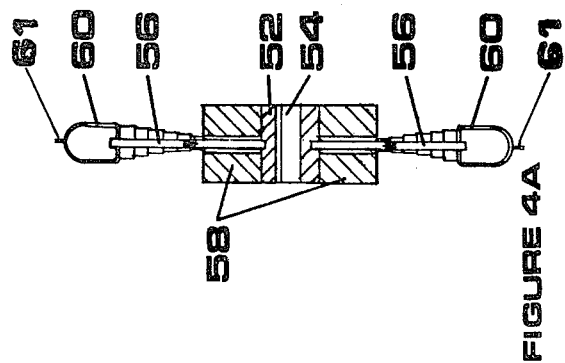
FIGS. 4A and 4B are side and front views respectively of the flywheel shown in FIG. 1.
Figure 4B:
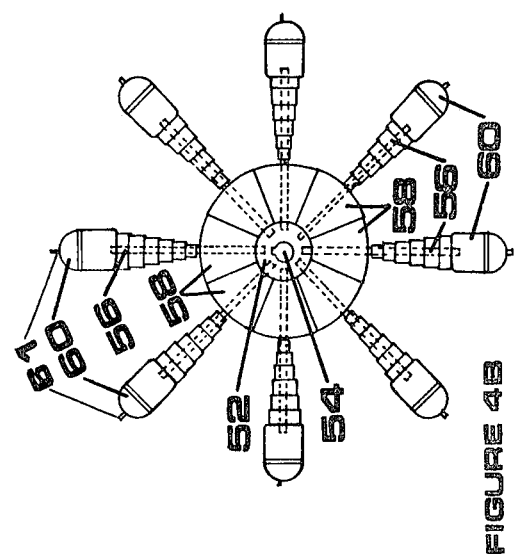

FIG. 4A is a side cross-sectional view of a flywheel 22 (FIG. 1), and FIG. 4B is a front view of flywheel 22. It comprises a central hub 52 having a notched aperture 54 therein which accommodates the generator shaft of electric generator 20 (FIG. 1). A plurality of radially extending shafts 56 are fixed to hub 52 and rotate therewith. A weight 58 having an aperture therethrough is slidingly coupled on each shaft 56 such that as hub 52 is rotated, weights 58 will move radially outward. Also coupled to each shaft 56 is a sealed telescoping member 60 filled with air. Thus, as the flywheel begins to rotate, weights 58 occupy positions adjacent hub 52. As the flywheel turns more rapidly, weights 58 begin to move radially outward on shafts 56. As the weights move outward, they compress telescoping members 60. When the flywheel begins to slow down, the pneumatic action of telescoping members 60 urge weights 58 radially inward towards hub 52. Thus, the flywheel is a loadless start flywheel with a pneumatic return. An air valve 61 is provided in members 60 so as to vary the amount of air contained within telescoping members 60.

The above description is given by way of example only. Changes in form and details may be made by one skilled in the art without departing from the scope of the invention as defined by the appended claims.

What is claimed is:

1. A flywheel comprising:
a hub having a central aperture therethrough;
a pluralty of shafts fixedly coupled to said hub and extending radially outward therefrom;
pneumatic means coupled to the end of said plurality of shafts; and
a plurality of weights, each one slidably mounted on one of said plurality of shafts between said hub and said pneumatic means for compressing said pneumatic means as the rotational speed of the flywheel increases, said pneumatic means urges said weights toward said hub as the rotational speed of said flywheel decreases, said central aperture is notched, each of said pneumatic means includes an air valve for varying the amount of air sealed within said pneumatic means.

* * * * *